United States Patent
Ayliffe et al.

(10) Patent No.: US 9,989,700 B1
(45) Date of Patent: Jun. 5, 2018

(54) OPTICAL COUPLER FOR OPTICAL COMMUNICATIONS TRANSCEIVER

(71) Applicant: Lumentum Operations LLC, Milpitas, CA (US)

(72) Inventors: Michael Ayliffe, Ottawa (CA); Zhaoming Li, Shenzhen (CN)

(73) Assignee: Lumentum Operations LLC, Milpitas, CA (US)

( * ) Notice: Subject to any disclaimer, the term of this patent is extended or adjusted under 35 U.S.C. 154(b) by 0 days. days.

(21) Appl. No.: 15/425,651

(22) Filed: Feb. 6, 2017

(51) Int. Cl.
| | |
|---|---|
| *G02B 6/126* | (2006.01) |
| *G02B 6/12* | (2006.01) |
| *G02B 6/27* | (2006.01) |
| *G02B 6/42* | (2006.01) |
| *G02B 6/30* | (2006.01) |

(52) U.S. Cl.
CPC ......... *G02B 6/12004* (2013.01); *G02B 6/126* (2013.01); *G02B 6/2706* (2013.01); *G02B 6/2746* (2013.01); *G02B 6/2766* (2013.01); *G02B 6/30* (2013.01); *G02B 6/4213* (2013.01); *G02B 6/4246* (2013.01); *G02B 2006/1215* (2013.01); *G02B 2006/12102* (2013.01); *G02B 2006/12104* (2013.01)

(58) Field of Classification Search
CPC .......... G02B 6/43; G02B 6/4214; G02B 6/12; G02B 6/12004; G02B 6/126; G02B 6/27; G02B 6/2706
See application file for complete search history.

(56) References Cited

U.S. PATENT DOCUMENTS

| | | | |
|---|---|---|---|
| 6,169,626 B1 * | 1/2001 | Chen | G02B 6/29352 359/237 |
| 8,676,004 B1 | 3/2014 | Urata et al. | |
| 9,215,032 B2 * | 12/2015 | Zhang | G02B 27/28 |

OTHER PUBLICATIONS

Dai et al., "Novel concept for ultracompact polarization splitter-rotator based on silicon nanowires," Optics Express, vol. 19, No. 11, 2011, 10 pages.
Lu et al., "Wideband silicon photonic polarization beamsplitter based on point-symmetric cascade broadband couplers," Optics Express, vol. 23, No. 23, 2015, 10 pages.
Zhou et al., "Ultra-compact and broadband Si photonics polarization rotator by self-alignment process," Optics Express, vol. 23, No. 5, 2015, 7 pages.
Sacher et al., "Polarization rotator-splitters in standard active silicon photonics platforms," Optics Express, vol. 22, No. 4, 2014, 10 pages.

(Continued)

*Primary Examiner* — Jennifer Doan
(74) *Attorney, Agent, or Firm* — Harrity & Harrity, LLP (57) ABSTRACT

A planar lightwave circuit may include a set of components. The set of components may include an input waveguide to couple to an optical communications transceiver. The set of components may include an output waveguide to couple to the optical communications transceiver. The set of components may include a common port to couple to an optical fiber. The set of components may include a first polarization beam splitter. The set of components may include a second polarization beam splitter. The set of components may include a third polarization beam splitter. The set of components may include a rotator assembly including a Faraday rotator and a quarter-wave plate.

20 Claims, 11 Drawing Sheets

(56) References Cited

OTHER PUBLICATIONS

Anderson et al., "Silicon Photonic Dual-Polarization Nanotaper for Chip-to-Fiber Coupling," Optical Society of America, Mar. 14, 2015, 3 pages.

Ghosh et al., "Ce:YIG/Silicon-on-Insulator waveguide optical isolator realized by adhesive bonding," Optics Express, vol. 20, No. 2, 2012, 10 pages.

Fiber Optic Equipment Solutions, "The Working Principle of the Optical Circulator," http://www.fiber-optic-equipment.com/working-principle-of-optical-circulator.html, Nov. 10, 2014, 3 pages.

* cited by examiner

OPTICAL COUPLER FOR OPTICAL COMMUNICATIONS TRANSCEIVER

TECHNICAL FIELD

The present disclosure relates to laser systems. More particularly, the present disclosure relates to an optical coupler to couple an input and an output of an on-chip bi-directional optical communications transceiver to an optical fiber via a single common port.

BACKGROUND

Optical communications transceivers provide laser light and receive laser light at specific wavelengths for optical communications. Some optical communications transceivers may utilize multiple optical fibers for optical communications. For example, a particular optical communications transceiver may transmit a first beam using a first optical fiber coupled to an output port of the particular optical communications transceiver and may receive a second beam using a second optical fiber coupled to an input port of the particular optical communications transceiver. With data centers including increased quantities of optical communications transceivers, reducing a quantity of optical fibers used for each optical communications transceiver is advantageous. Similarly, with the high cost to lay new fiber optic cables (e.g. inter-state, submarine, etc.), reducing a quantity of optical fibers used for each optical communications transceiver is advantageous.

Thus, a circulator may be coupled to an optical communications transceiver to dynamically switch between an output port and an input port, thereby permitting the optical communications transceiver to transmit and receive optical beams using a single optical fiber. The circulator may be attached to the optical communications transceiver at a faceplate of a system rack, thereby increasing the overall size of the optical communications transceiver, and may add overall cost to the optical communications transceiver. Accordingly, obviating a need for mounting the circulator to the faceplate of the system rack and reducing an overall size and overall cost of an optical communications transceiver and optical coupler assembly would be advantageous.

SUMMARY

According to some possible implementations, an optical device may include a set of components. The set of components may include an input, an output, and a common port. The set of components may include a first beam splitter, a second beam splitter, and a third beam splitter. The set of components may include an optical rotator. The set of components may be disposed to form an input optical path to couple an input optical beam of a first polarization from the input to the common port through the first beam splitter, the second beam splitter, and the optical rotator. The optical rotator may be to rotate the input optical beam to a second polarization orthogonal to the first polarization. The set of components may be disposed to form an output optical path to couple an output optical beam from the common port to the output, the output optical path having a first branch and a second branch. The first beam splitter may be to split the first branch and the second branch. The first branch may be to couple a first portion of the output optical beam through the first beam splitter, the second beam splitter, the third beam splitter, and the optical rotator, where the optical rotator is to effect no net change on a polarization of the first portion. The second branch may be to couple a second portion of the output optical beam through the first beam splitter and the third beam splitter. The third beam splitter may be to combine the first branch and the second branch.

According to some possible implementations, a planar lightwave circuit may include a set of components. The set of components may include an input waveguide to couple to an optical communications transceiver. The set of components may include an output waveguide to couple to the optical communications transceiver. The set of components may include a common port to couple to an optical fiber. The set of components may include a first polarization beam splitter. The set of components may include a second polarization beam splitter. The set of components may include a third polarization beam splitter. The set of components may include a rotator assembly including a Faraday rotator and a quarter-wave plate.

According to some possible implementations, an optical device may include an optical communications transceiver. The optical device may include an optical coupler to couple a transmitter of the optical communications transceiver and a receiver of the optical communications transceiver to a single optical fiber. The optical coupler may include an input optical path to couple the transmitter to a common port through a first beam splitter, a second beam splitter, and an optical rotator. The optical rotator may be to rotate a first beam from the transmitter from a first polarization state to a second polarization state orthogonal to the first polarization state. The optical coupler may include an output optical path to couple the receiver to the common port, the second beam splitter to split the output optical path into a first branch and a second branch. The first branch may be to couple a first portion of a second beam from the common port through the first beam splitter, the second beam splitter, a third beam splitter, and the optical rotator. The optical rotator may be to cause no net change on a polarization state of the first portion. The second branch may be to couple a second portion of the second beam through the first beam splitter and the third beam splitter. The third beam splitter may be to recombine the first branch and the second branch and to couple the recombined first branch and second branch to the receiver.

DETAILED DESCRIPTION

The following detailed description of example implementations refers to the accompanying drawings. The same reference numbers in different drawings may identify the same or similar elements.

An optical communications transceiver may provide light and/or receive light to enable optical communication. Thus, an optical communications transceiver may include multiple optical ports, such as an input port and an output port, to couple optical beams (e.g. to and/or from another optical communications transceiver). In another example, the optical communications transceiver may provide light to an optical communications receiver and may receive light from an optical communications transmitter. The optical communications transceiver may transmit light to and/or receive light from another optical communications transceiver or an optical communications transmitter and an optical communications receiver via an optical fiber. For example, the optical communications transceiver may connect to another optical communications transceiver using a first optical fiber to transmit light and a second optical fiber to receive light.

A size of optical communications transceivers has remained fixed and, in some cases, has decreased over time. However, a quantity of optical communications transceivers included in a data center has increased over time. Accordingly, reducing a quantity of optical fibers and a size of optical communications transceivers is desirable. An optical coupler, such as an optical circulator, may be attached to the optical communications transceiver at a faceplate of a system rack to permit the optical communications transceiver to transmit and receive light via a single optical fiber. However, a circulator may increase an overall size and cost of the optical communications transceiver.

Implementations, described herein, may provide an optical coupler to couple an output port and an input port of an optical communications transceiver to a single optical fiber for optical communications. In this way, the optical coupler may enable a reduced form factor and a reduced cost for optical communications transceivers. Moreover, the optical coupler may be integrated into a dongle coupled to an end of an optical fiber, such as via an active optical cable (AOC), thereby obviating a need to attach the optical coupler to the optical communications transceiver at the faceplate of a system rack, and thereby permitting an increased quantity of optical communications transceivers to be included in the system rack.

Figure 1A:
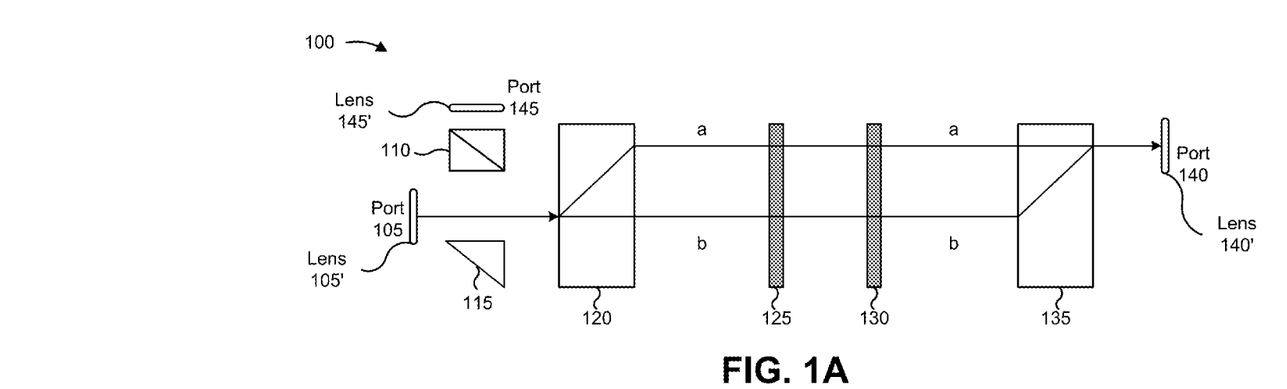
FIGS. 1A and 1B are diagrams of an optical circulator device.
Figure 1B:
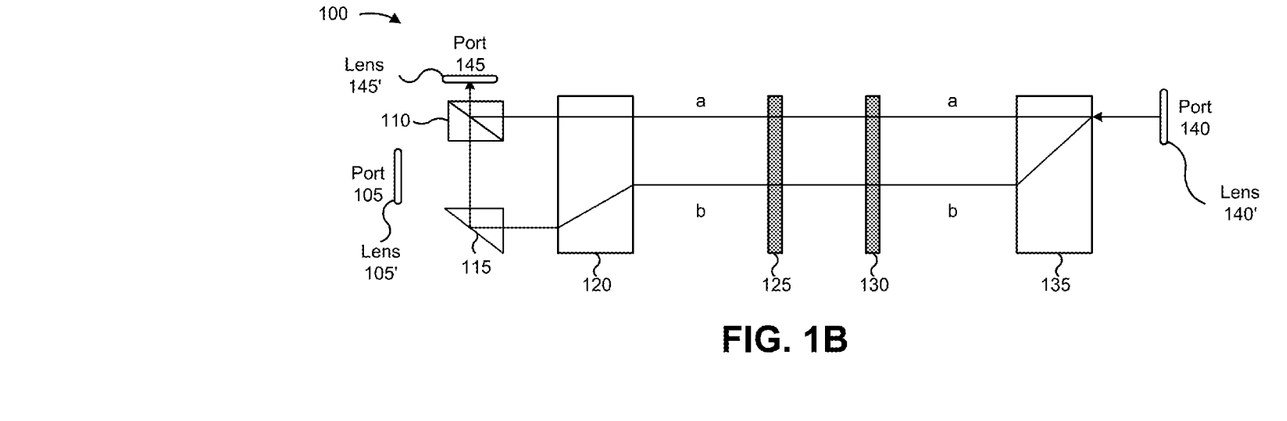

FIGS. 1A and 1B are diagrams of an example implementation of an optical circulator 100 that couples an input port and an output port of an optical transceiver to a common port. As shown in FIG. 1A, in a block diagram view, the optical circulator 100 includes a port 105 and lens 105', a polarization beam splitter 110, a mirror 115, a birefringent crystal 120, a Faraday rotator 125, a half-wave plate 130, a birefringent crystal 135, a port 140 and lens 150', and a port 145 and lens 145'.

As further shown in FIG. 1A, a first optical beam is directed from port 105 to birefringent crystal 120. Port 105 is an input port of the optical circulator, and may couple to an output port of an optical communications transceiver via focusing lens 105' to receive the first beam from the optical communications transceiver. Birefringent crystal 120 splits the first beam into a first portion along a first optical path, a, and a second portion along a second optical path, b, based on a polarization state of the first beam. For example, birefringent crystal 120 splits the first beam into two portions of orthogonal polarization. Birefringent crystal 120 directs the first portion and the second portion of the first beam along the first optical path and the second optical path, respectively, through Faraday rotator 125 and half-wave plate 130. Faraday rotator 125 and half-wave plate 130 rotate the first portion or the second portion of the first beam, and direct the first portion and the second portion to birefringent crystal 135, where the first portion and the second portion are recombined to provide a recombined first beam as output of the optical communications transceiver via focusing lens 140' and port 140.

As shown in FIG. 1B, a second beam is directed from lens 140' and port 140 to birefringent crystal 135. Port 140 is a common port of the optical circulator. The common port refers to a port that is configured to be used for both transmission of optical beams and reception of optical beams (e.g., the common port is bidirectional). Birefringent crystal 135 splits the second beam into a first portion directed along first optical path a and a second portion directed along second optical path b. The first portion and the second portion are directed to half-wave plate 130 and Faraday rotator 125, which rotate the first portion and/or the second portion, and direct the first portion and/or the second portion toward birefringent crystal 120. Birefringent crystal 120 directs the second portion toward mirror 115 and the first portion toward polarization beam splitter 110. Mirror 115 directs the second portion toward polarization beam splitter 110, which recombines the first portion and the second portion to provide a recombined second beam as input to the optical communications transceiver via focusing lens 145' and port 145. In this case, each of lens 105, 140, and 145 requires a corresponding lens 105', 140', and 145', respectively. As a result, optical circulator 100 requires an excessive quantity of components resulting in excessive cost and size.

Furthermore, the optical communications transceiver can bi-directionally communicate with another optical communications transceiver over a single optical fiber using the optical circulator. However, the birefringent crystals may be expensive and/or may increase manufacturing difficulty. Moreover, overall package size of the optical circulator may be excessive for utilization in data centers with increasing quantities of optical communications transceivers.

As indicated above, FIGS. 1A and 1B are provided merely as an example. Other examples are possible and may differ from what was described with regard to FIGS. 1A and 1B.

FIGS. 2A-2D are diagrams of an example implementation 200 of an optical device. FIGS. 2A-2D show an example of an optical coupler that includes an input port, an output port, and a common port.

Although implementations, described herein, are described in terms of an optical communications transceiver communicating with another optical communications transceiver, other implementations are possible, such as an optical communications transceiver communicating with an optical communications transmitter and an optical communications receiver, a collocated optical communications transmitter and optical communications receiver communicating with an optical communications transceiver, or the like.

Figure 2A:
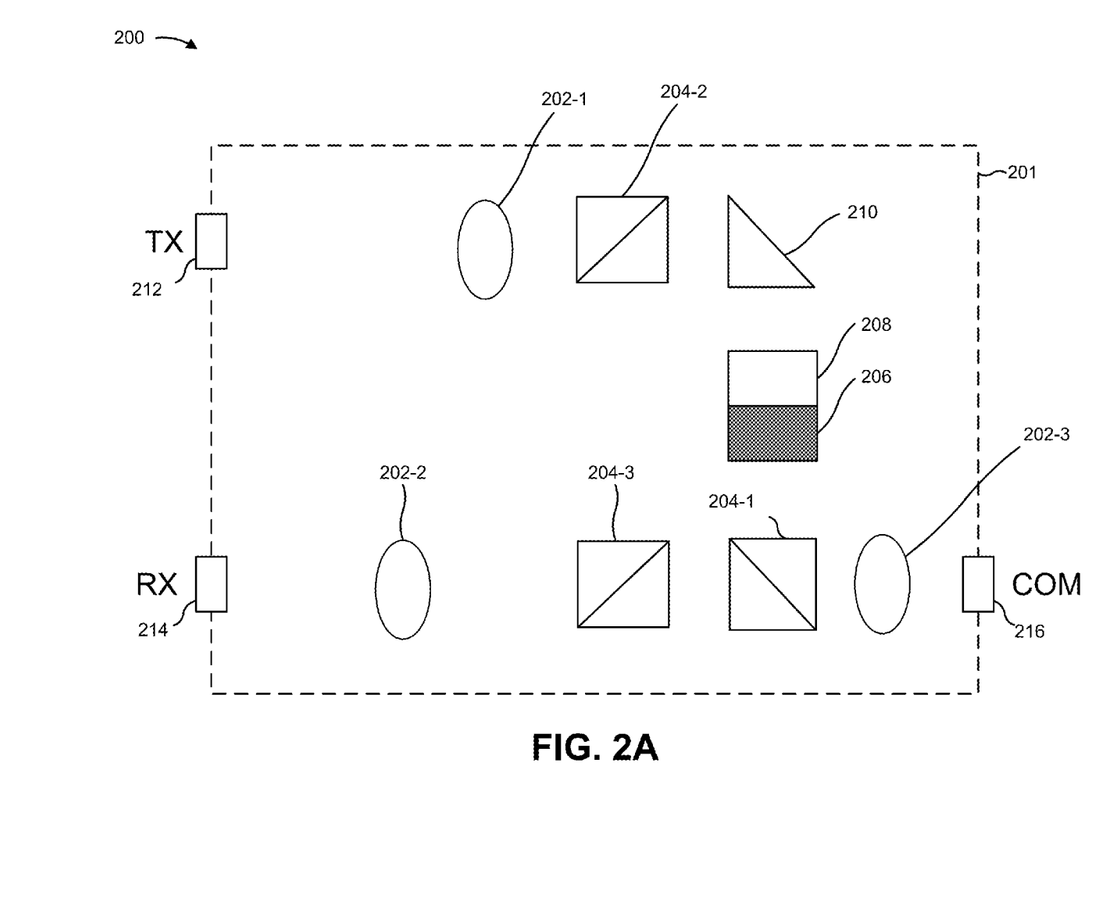
FIGS. 2A-2D are diagrams of an example implementation of an optical coupler that includes an input port, an output port, and a common port.

As shown in FIG. 2A, an optical coupler 201 includes a set of optical components, such as a set of lenses 202, a set of polarization beam splitters 204, a Faraday rotator 206, a waveplate 208, a mirror 210, a transmission (TX) port 212, a reception (RX) port 214, and a common (COM) port 216. In this case, optical coupler 201 includes fewer components than, for example, optical circulator 100 resulting in reduced cost and/or package size. In some implementations, lenses 202 may include collimating lenses to collimate light. In some implementations, waveplate 208 may be a half-wave plate or a quarter-wave plate. In some implementations, Faraday rotator 206 may include a garnet crystal-based Faraday rotator. Collectively, waveplate 208 and Faraday rotator 206 may be termed an optical rotator. In another example, optical coupler 201 may utilize another type of optical rotator, such as an optical rotator including a different set of optical components. In some implementations, polarization beam splitters 204 may include birefringent crystal rhomboids.

TX port 212, an input port of optical coupler 201, is configured to receive an input optical beam from an optical communications transceiver and direct the input optical beam to COM port 216 and COM port 216 is configured to receive an output optical beam from an optical fiber (e.g., from another optical communications transceiver), and direct the output optical beam to RX port 214, an output port of optical coupler 201, as described herein. For example, optical coupler 201 may receive a first beam as input at TX port 212 for output via COM port 216 and a second beam as input to COM port 216 for output via RX port 214.

Figure 2B:
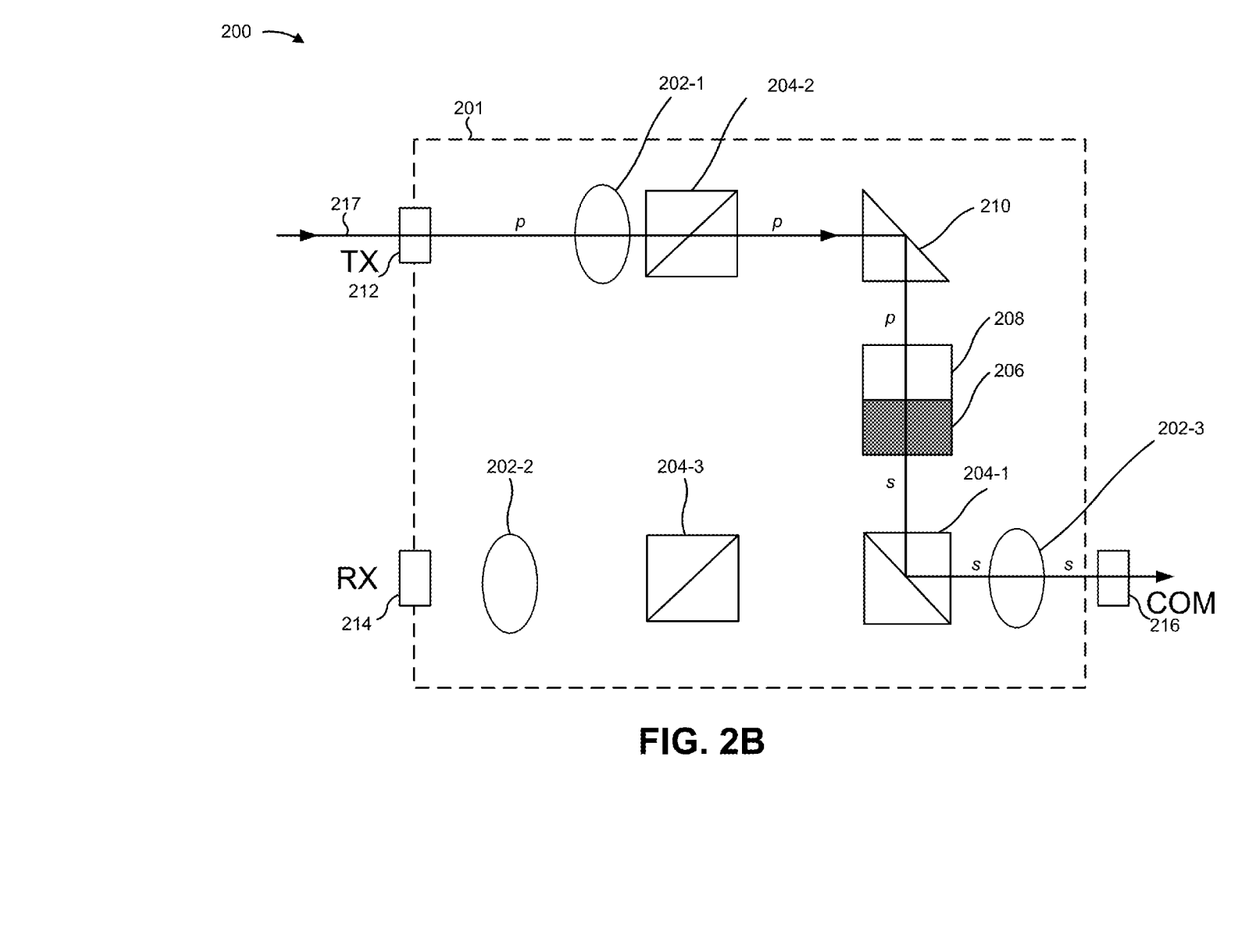

As shown in FIG. 2B, the set of optical components of optical coupler 201 are disposed in a particular order to form an input optical path 217 to couple an input optical beam (i.e., an output optical beam of an optical communications transceiver input to TX port 212) from TX port 212 to COM port 216. For example, TX port 212 may receive an input optical beam of a first polarization state (e.g., the input optical beam may be polarized), and may provide the input optical beam to lens 202-1. In this case, the first polarization state is parallel, p, to an optical incident plane. Lens 202-1 collimates the input optical beam, and directs the input optical beam to polarization beam splitter 204-2. Polarization beam splitter 204-2 passes the input optical beam based on the first polarization state of the input optical beam, and directs the input optical beam to mirror 210. Mirror 210 reflects the input optical beam to waveplate 208 and Faraday rotator 206. Waveplate 208 and Faraday rotator 206 rotate the input optical beam to a second polarization state. For example, waveplate 208 and Faraday rotator 206 rotate the input optical beam 90 degrees to be perpendicular, s, to the optical incident plane, and direct the rotated input optical beam to polarization beam splitter 204-1. Based on the second polarization state, polarization beam splitter 204-1 reflects the rotated input optical beam, and directs the rotated input optical beam to lens 202-3. Lens 202-3 focuses the input optical beam, and directs the input optical beam to COM port 216 for output to an optical fiber coupled to COM port 216. In this way, an optical communications transceiver coupled to TX port 212 can transmit an optical beam via an optical fiber coupled to COM port 216.

Figure 2C:
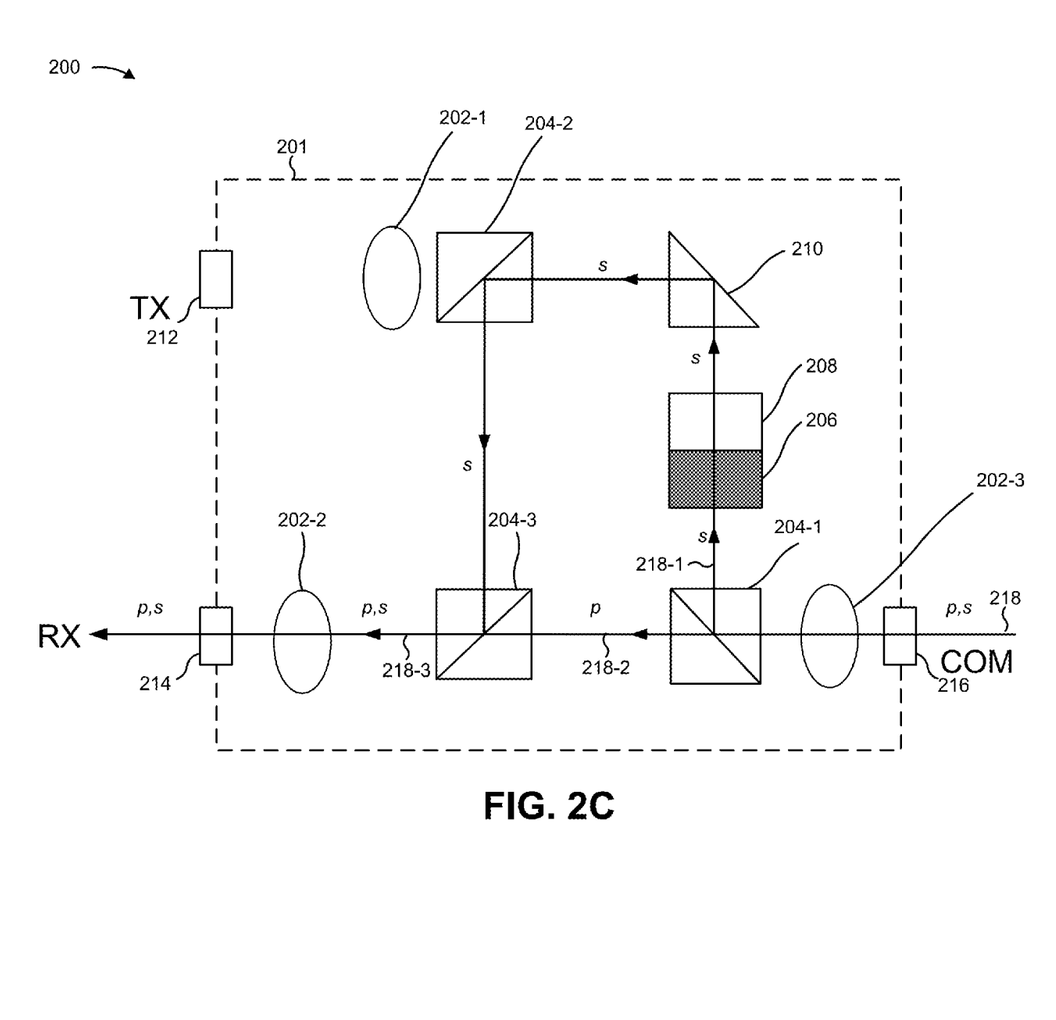

As shown in FIG. 2C, the set of optical components of optical coupler 201 are disposed in a particular order to form an output optical path 218 to couple an output optical beam (e.g., an optical beam, which is output from RX port 214, input to an optical communications transceiver coupled to RX port 214) from COM port 216 to RX port 214. For example, COM port 216 may receive an output optical beam of the first polarization state and the second polarization state, and may direct the output optical beam to lens 202-3. Lens 202-3 collimates the output optical beam, and directs the output optical beam to polarization beam splitter 204-1. Polarization beam splitter 204-1 splits the output optical beam into a first portion and a second portion. The first portion is associated with the second polarization state, s, and is directed via branch 218-1 of output optical path 218. The second portion is associated with the first polarization state, p, and is directed via branch 218-2 of output optical path 218.

As further shown in FIG. 2C, and with regard to branch 218-1, the first portion of the output optical beam is directed from polarization beam splitter 204-1 to Faraday rotator 206 and waveplate 208. The first portion of the output optical beam has no net change in the first polarization state based on the non-reciprocal polarization rotation (e.g., a 45 degree rotation in a first direction) from the Faraday rotator 206 being reversed by the reciprocal polarization (e.g., a 45 degree rotation in a second direction that is the reverse of the first direction) from the waveplate 208. The first portion of the output optical beam is directed to mirror 210, and directed to polarization beam splitter 204-2. Based on the first portion of the output optical beam being associated with the second polarization state, polarization beam splitter 204-2 reflects the first portion of the output optical beam, and directs the first portion of the output optical beam to polarization beam splitter 204-3.

As further shown in FIG. 2C, and with regard to branch 218-2, the second portion of the output optical beam is directed to polarization beam splitter 204-3 from polarization beam splitter 204-1. Polarization beam splitter 204-3 recombines the first portion of the output optical beam with the second portion of the output optical beam, as shown, and directs a recombined output optical beam 218-3 toward lens 202-2. Lens 202-2 focuses the recombined output optical beam, and directs the recombined output optical beam toward RX port 214. In this way, an optical communications transceiver coupled to RX port 214 can receive an optical beam via an optical fiber coupled to COM port 216.

Figure 2D:
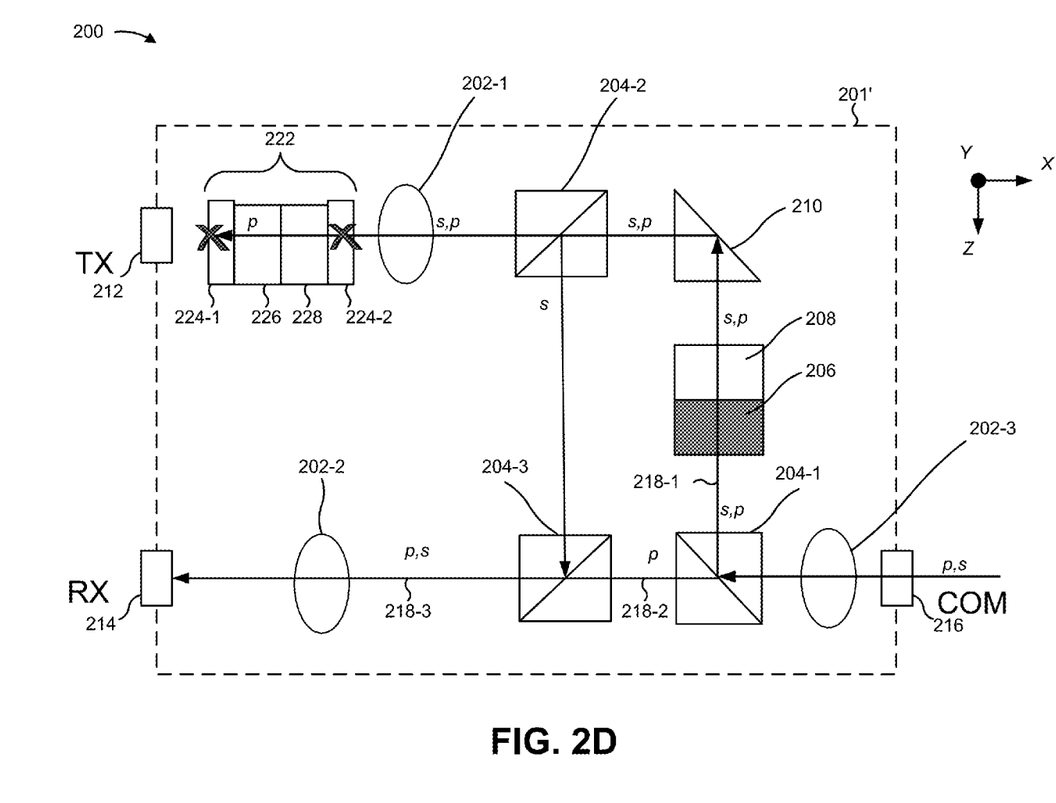

As shown in FIG. 2D, a similar optical coupler 201' includes an optical isolator 222. Optical isolator 222 includes a set of components, such as a polarizer 224-1, a waveplate 226, a Faraday rotator 228, and a polarizer 224-2. The polarization axes of polarizers 224 are aligned to a first axis, Z. Waveplate 226 is aligned at a particular angle, such as a 22.5 degree angle, with respect to a second axis, Y, that is orthogonal to the first axis.

Optical isolator 222 may be included in an optical coupler, such as optical coupler 201', to block light. For example, when an output optical beam is received via COM port 216, a portion of the output optical beam (e.g., the first portion as described herein) with the second polarization state is directed via branch 218-1 toward polarization beam splitter 204-2. Similarly, a small portion of residual light with the first polarization state may be passed via branch 218-1 as part of the portion of the output optical beam. In this case, polarization beam splitter 204-2 reflects the portion of the output optical beam with the second polarization state toward polarization beam splitter 204-3. However, a sub-portion of the portion of the output optical beam may be passed through polarization beam splitter 204-2 toward lens 202-1, such as a first sub-portion with the first polarization state and a second sub-portion with the second polarization state. Polarizer 224-2 blocks the second sub-portion with the second polarization state. Waveplate 226 and Faraday rotator 228 rotate the first sub-portion orthogonally, such as along the Y axis, to change the first sub-portion to the second polarization state. In this case, polarizer 224-1 blocks the rotated first sub-portion. In contrast, when an input optical beam is received via TX port 212 with the first polarization state, the set of components of optical isolator 222 pass the input optical beam through to lens 202-1.

In some implementations, another configuration of components of an optical coupler 201/201' may be utilized. For example, Faraday rotator 206 may be disposed between waveplate 208 and polarization beam splitter 204-2 in an optical path. An advantage of locating the Faraday rotator 206 and waveplate 208 between mirror 210 and polarization beam splitter 304-1 is a reduced footprint of the optical coupler 201/201'. In some implementations, each component of optical coupler 201 may be approximately 1 millimeter (mm)×1 mm in dimension. In some implementations, optical coupler 201 may be approximately 6 mm×12 mm in dimension.

As indicated above, FIGS. 2A-2D are provided merely as examples. Other examples are possible and may differ from what was described with regard to FIGS. 2A-2D.

Figure 3A:
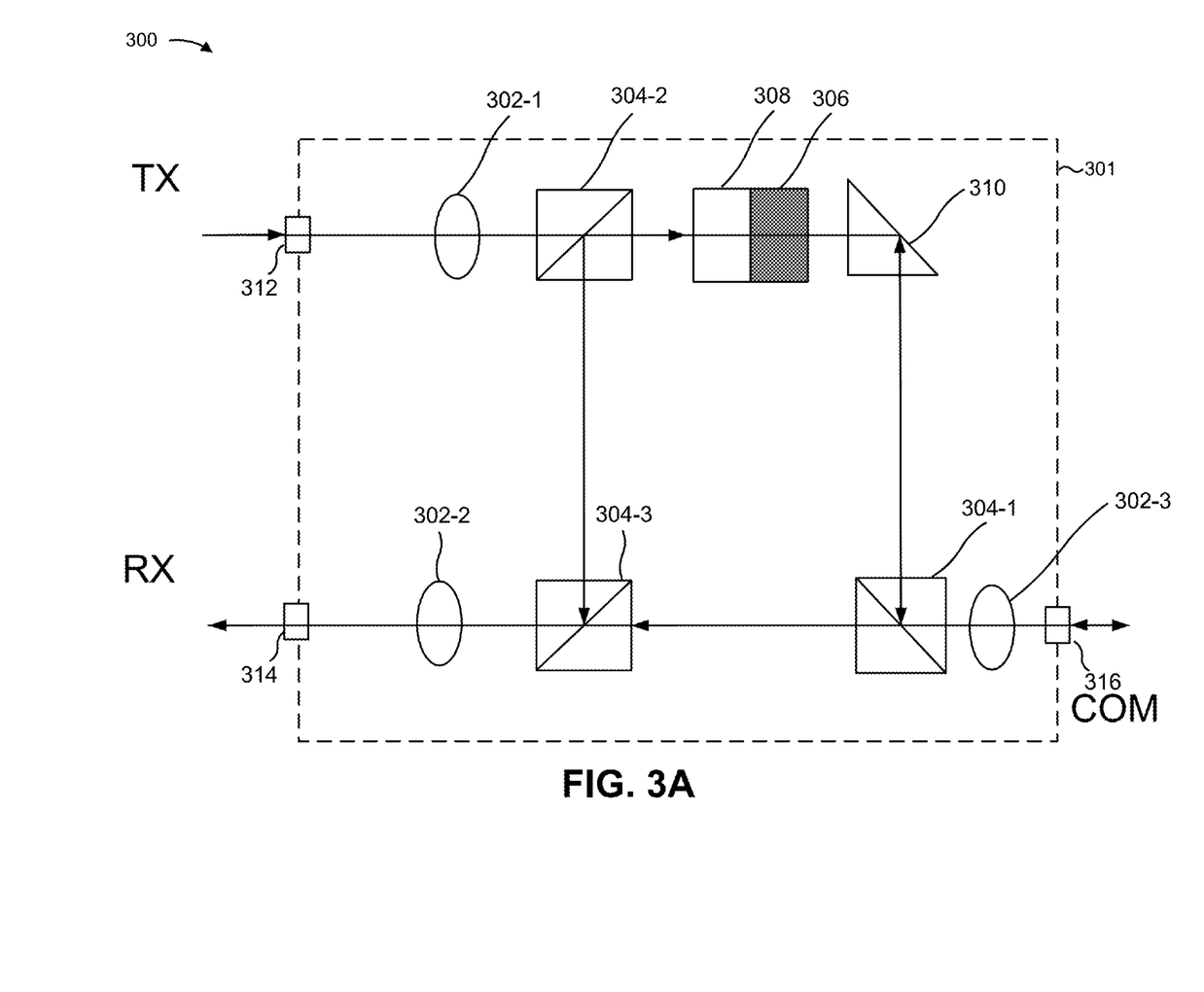
FIGS. 3A and 3B are diagrams of another example implementation of an optical coupler that includes an input port, an output port, and a common port.
Figure 3B:
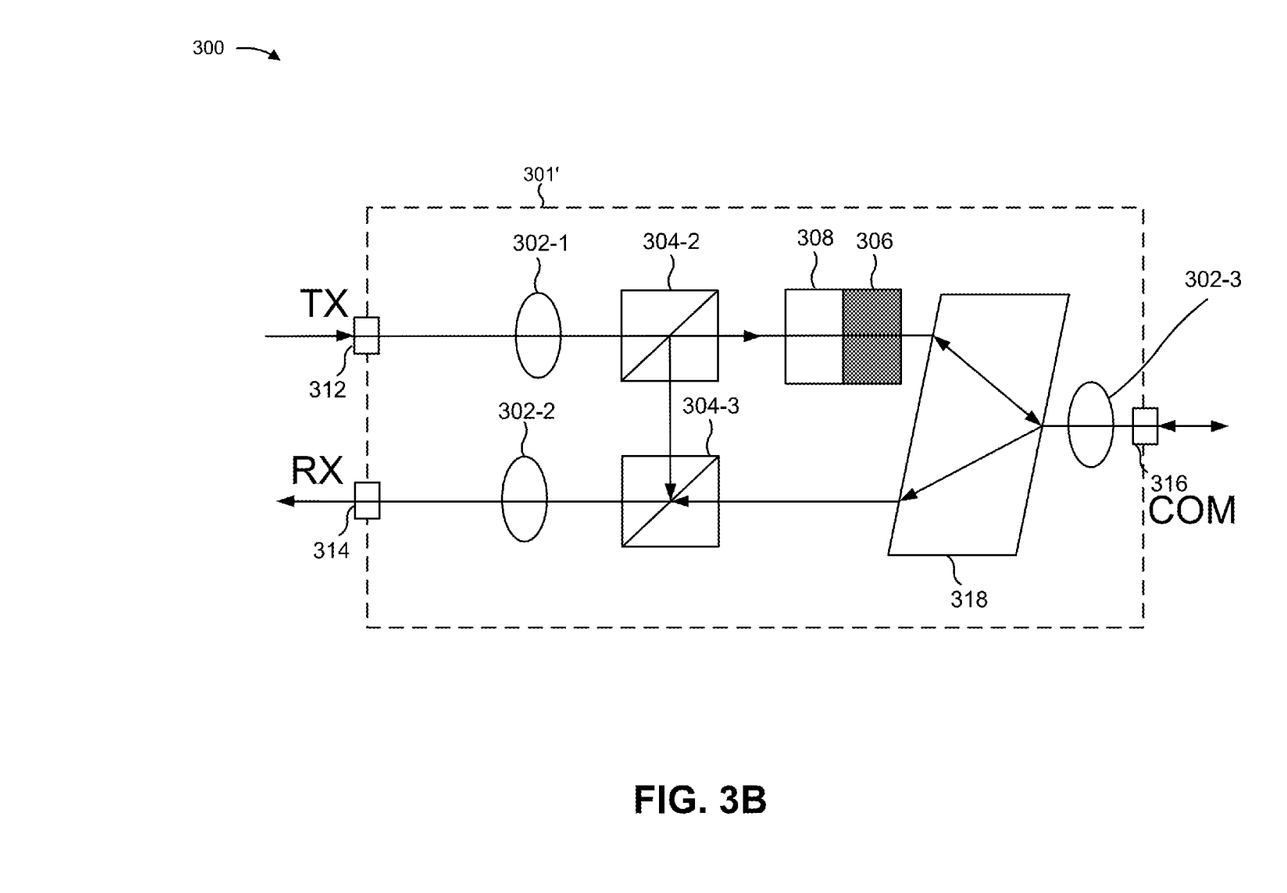

FIGS. 3A and 3B are diagrams of an example implementation 300 of an optical device. FIGS. 3A and 3B show an example of an optical coupler that includes an input port, an output port, and a common port.

As shown in FIG. 3A, an optical coupler 301 includes a set of lenses 302, a set of polarization beam splitters 304, a Faraday rotator 306, a waveplate 308, a mirror 310, a TX port 312, an RX port 314, and a COM port 316. With regard to an output optical beam received at TX port 312, the output optical beam is directed to lens 302-1, polarization beam splitter 304-2, waveplate 308, Faraday rotator 306, mirror 310, polarization beam splitter 304-1, lens 302-3, and COM port 316 for output via an optical fiber.

With regard to an input optical beam received at COM port 316, the input optical beam is directed to lens 302-3, and split into a first branch and a second branch at polarization beam splitter 304-1. As further shown in FIG. 3A, and with regard to the first branch, a first portion of the input optical beam with the second polarization is directed to mirror 310, to Faraday rotator 306, to waveplate 308, to polarization beam splitter 304-2, and to polarization beam splitter 304-3. With regard to the second branch, a second portion of the input optical beam with the first polarization is directed to polarization beam splitter 304-3, which recombines the first portion and the second portion into a recombined input optical beam. In this case, the recombined input optical beam is directed to lens 302-2, and to RX port 314 for input to an optical transmission transceiver. In this way, an alternative arrangement of components may be used for optical coupler 301 relative to optical coupler 201/201', such as positioning Faraday rotator 306 and waveplate 308 between polarization beam splitter 304-2 and mirror 310 in an optical path rather than between mirror 210 and polarization beam splitter 204-1 in another optical path.

As shown in FIG. 3B, an optical coupler 301' includes a set of lenses 302, a set of polarization beam splitters 304, a Faraday rotator 306, a waveplate 308, a TX port 312, an RX port 314, a COM port 316, and a birefringent crystal rhomboid 318. In this case, with regard to an output optical path, an output optical beam received from an optical communications transceiver is input at TX port 312 and is directed to lens 302-1, to polarization beam splitter 304-2, to waveplate 308, to Faraday rotator 306, and to birefringent crystal rhomboid 318. Based on the first polarization state of the output optical beam, the output optical beam is directed at a first angle through birefringent crystal rhomboid 318, is directed from birefringent crystal rhomboid 318 to lens 302-3, and is directed to COM port 316.

As further shown in FIG. 3B, and with regard to an input optical path, an input optical beam received at COM port 316 is directed to lens 302-3 and to birefringent crystal rhomboid 318. Birefringent crystal rhomboid 318 splits the input optical beam into a first portion associated with the second polarization state and a second portion associated with the first polarization state. With regard to a first optical path, the first portion is directed at a second angle, and to Faraday rotator 306, waveplate 308, polarization beam splitter 304-2, and polarization beam splitter 304-3. With regard to a second optical path, the second portion is directed at a third angle, and to polarization beam splitter 304-3. In this case, polarization beam splitter 304-3 recombines the first portion and the second portion into a recombined input optical beam, and directs the recombined input optical beam to lens 302-2 and to RX port 314 for input to the optical communications transceiver.

In this way, optical coupler 301' may utilize another set of components relative to optical coupler 301 and/or optical coupler 201/201'. For example, optical coupler 317 may utilize birefringent crystal rhomboid 318 rather than include mirror 310 and polarization beam splitter 304-1.

As indicated above, FIGS. 3A and 3B are provided merely as examples. Other examples are possible and may differ from what was described with regard to FIGS. 3A and 3B.

Figure 4:
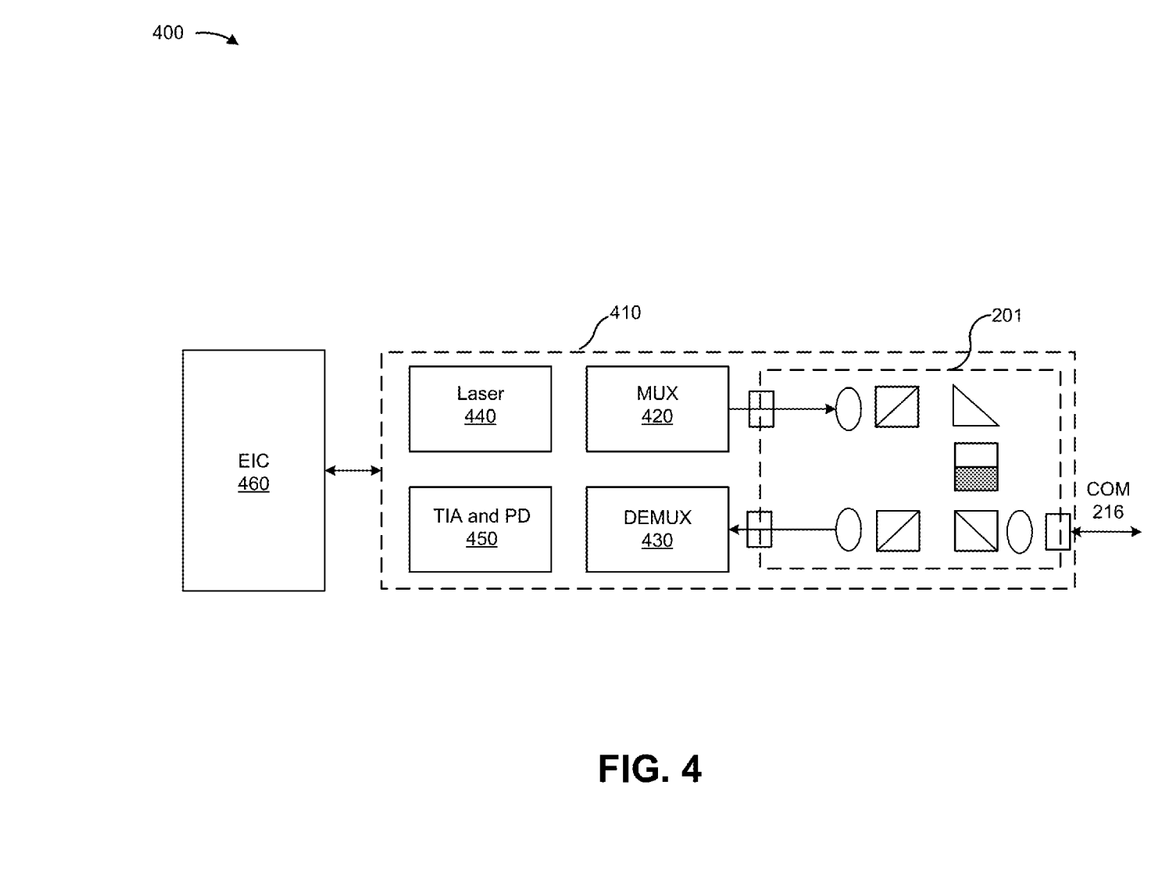
FIG. 4 is a diagram of an example implementation of a free-space optics optical coupler that includes an input port, an output port, and a common port.

FIG. 4 is a diagram of an example implementation 400 of an optical device. FIG. 4 shows an example of a free-space optics optical coupler coupled to an optical communications transceiver.

As shown in FIG. 4, example implementation 400 includes a transmitter/receiver optical subassembly (TROSA) 410. TROSA 410 includes a multiplexer (MUX) 420, a demultiplexer (DEMUX) 430, a laser 440, a transimpedance amplifier (TIA) and photodetector (PD) 450, and an optical coupler 201. Example implementation 400 further includes an electronic integrated circuit (EIC) 460 electrically coupled to TROSA 410. In some implementations, MUX 420 and/or DEMUX 430 may be implemented in free space optics, an arrayed waveguide grating (AWG), an echelle grating coupler, a cascade Mach-Zehnder (MZ) interferometer, or the like. In some implementations, laser 440 is an optical communications transmitter or transmitters (e.g. including lasers, modulators, and/or other components) electrically coupled to and driven by EIC 460. In some implementations, TIA and PD 450 is an optical communications receiver electrically coupled to EIC 460. In some implementations, TROSA 410 is an optical communications transceiver. In some implementations, laser 440, MUX 420, DEMUX 430, and/or TIA and PD 450 may be substituted or omitted from the TROSA 410.

Based on using optical coupler 201 to couple to an optical fiber, TROSA 410 may be manufactured with a smaller package size and/or at a lower cost relative to another type of optical communications transceiver using another type of optical coupler, such as an optical circulator that uses a greater quantity of components, more expensive components, or the like. In another example, TROSA 410 may utilize another type of optical coupler, such as optical coupler 201', optical coupler 301, optical coupler 301', and/or another optical coupler described herein.

With regard to FIG. 4, TROSA 410 uses a single COM port 216 to communicate via a single optical fiber. For example, based on MUX 420 multiplexing a modulated optical signal from laser 440, TROSA 410 outputs a multiplexed, modulated optical signal via COM port 216 based on optical coupler 201 coupling MUX 420 to COM port 216. In this case, EIC 460 may provide an electrical signal to laser 440 to cause laser 440, or other parts of TROSA 410 not illustrated such as a modulator, to generate a modulated optical signal for MUX 420. Additionally, or alternatively, based on receiving a multiplexed, modulated optical signal via COM port 216 and based on optical coupler 201 coupling COM port 216 to DEMUX 430, DEMUX 430 demultiplexes the multiplexed, modulated optical signal, and provides a modulated optical signal to TIA and PD 450. In this case, EIC 460 may receive an electrical signal from TIA and PD 450 based on TIA and PD 450 receiving the modulated optical signal. Instead of coupling fibers at the input port and the output port of optical coupler 201, TROSA 410 may couple light beams between freespace and the input and output ports.

As indicated above, FIG. 4 is provided merely as an example. Other examples are possible and may differ from what was described with regard to FIG. 4.

Figure 5A:
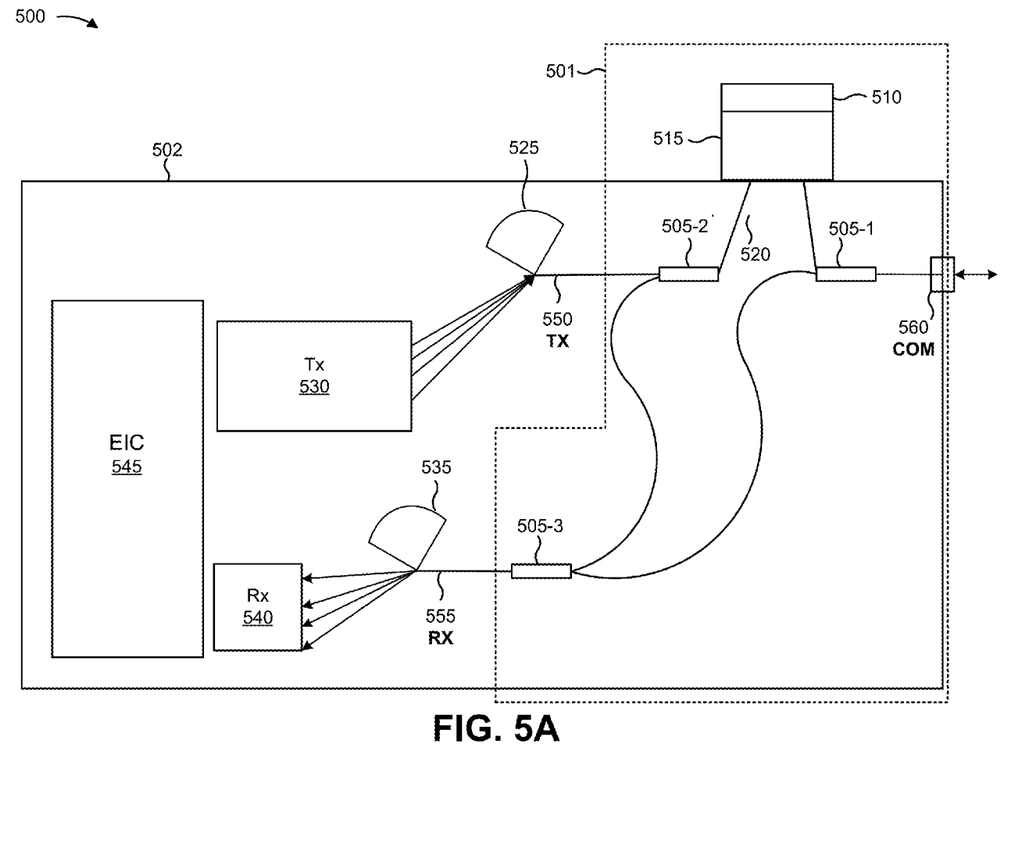
FIGS. 5A-5C are diagrams of an example implementation of a planar lightwave circuit (PLC) optical coupler that includes an input port, an output port, and a common port.
Figure 5B:
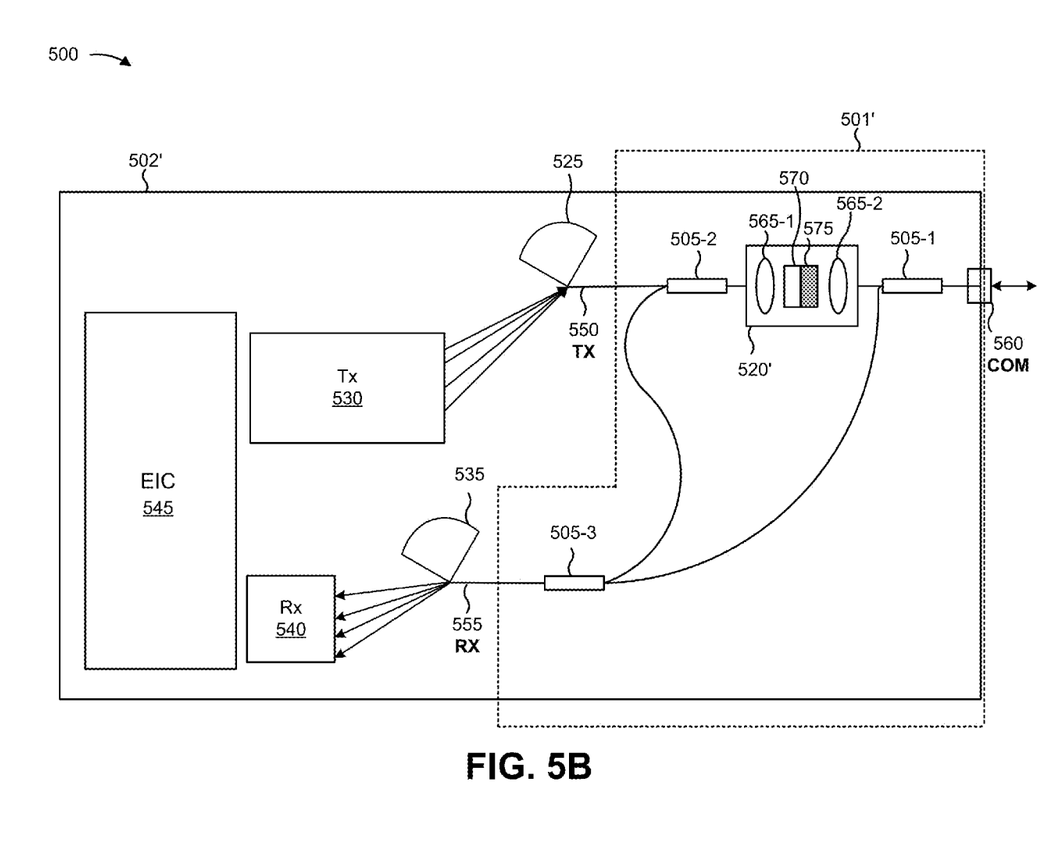
Figure 5C:
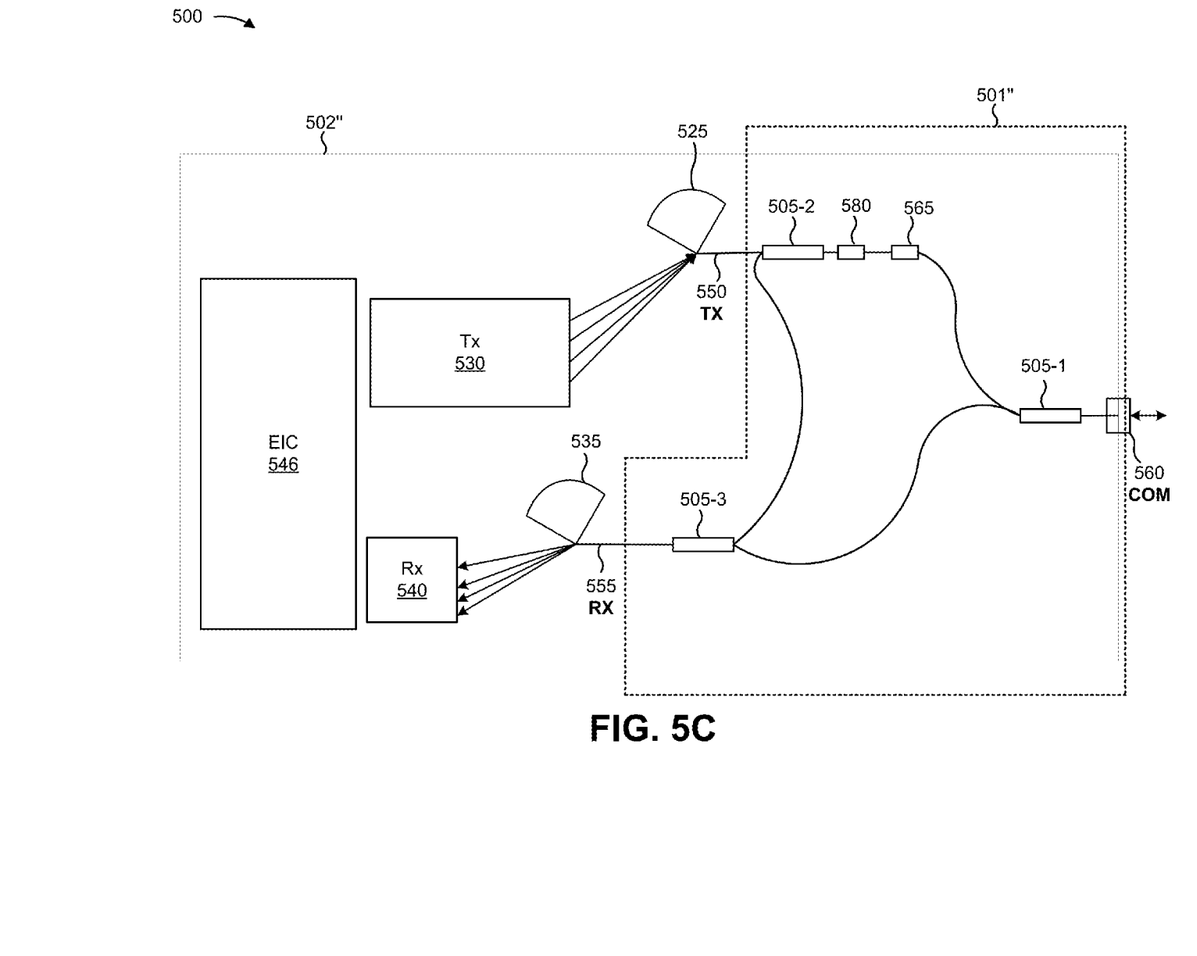

FIGS. 5A-5C are diagrams of an example implementation 500 of an optical device. FIGS. 5A-5C show an example of a planar lightwave circuit (PLC) optical coupler coupled to an optical communications transceiver.

As shown in FIG. 5A, a PLC 502 may integrate a multiplexer (MUX) 525, a transmitter (TX) 530, a demultiplexer (DEMUX) 535, a receiver (RX) 540, an electronic integrated circuit (EIC) 545, and an optical coupler 501. Each of the optical coupler 501 MUX 525, TX 530, DEMUX 535, RX 540, and EIC 545 may include components implemented in PLC 502 or integrated into or onto PLC 502. In some implementations, PLC 502 may comprise gallium arsenide, indium phosphide or silicon. As shown, the input port and output port of coupler 201 have been replaced with inputs and outputs within the PLC 502 and between optical coupler 501 and the MUX 525 and DEMUX 535, respectively. In some implementations, the input and output of optical coupler 501 may be waveguides connecting optical coupler 501 to MUX 525 and DEMUX 535, respectively.

Optical coupler 501 may include a set of polarization beam splitters 505, a Faraday rotator 510, a collimating lens 515, a waveplate 520 (e.g., in a trench in PLC 502), a TX port 550, an RX port 555, and a COM port 560. In some implementations, the set of polarization beam splitters 505, Faraday rotator 510, collimating lens 515, waveplate 520, or the like may be implemented in a particular silicon chip, such as using an insulator on silicon (IOS) structure. In another example, optical coupler 501 may include an input and an output coupling optical coupler 501 to MUX 525 and DEMUX 535, respectively. In another example, PLC 502 may include an input waveguide and an output waveguide that couple an optical communications transceiver to a common port via a set of components of optical coupler 501.

In some implementations, MUX 525, transmitter 530, DEMUX 535, receiver 540, EIC 545, or the like may be implemented on the particular silicon chip. For example, transmitter 530 may be disposed onto the particular silicon chip using a direct butt joint coupling, a vertical grating coupler, or the like. Similarly, MUX 525 and DEMUX 535 may be implemented in echelle gratings mounted to the particular silicon chip. In some implementations, MUX 525, transmitter 530, DEMUX 535, receiver 540, EIC 545, and the optical coupler 501 may be implemented in a particular silicon chip.

In some implementations, Faraday rotator 510 provides non-reciprocal optical polarization rotation, and may include a reflective coating. In some implementations, waveplate 520 may provide reciprocal polarization rotation. For example, a beam directed from polarization beam splitter 505-2 to polarization beam splitter 505-1 (e.g., an output optical beam directed along the output optical path, as described herein) may be polarization rotated orthogonally by the combined effect of the waveplate 520 and Faraday rotator 510. In contrast, a beam directed from polarization beam splitter 505-1 to polarization beam splitter 505-2 (e.g., an input optical beam directed along the first branch of an input optical path, as described herein) may be passed through without a net change to the beam's polarization (e.g. the polarization effects of the Faraday rotator 510 and the waveplate 520 cancel out in this direction). In some implementations, waveplate 520, which may be a half-wave plate or a quarter-wave plate, may be disposed in a trench (e.g., a groove cut into the particular chip perpendicular to a waveguide of the chip). In some implementations, collimating lens 515 may be a gradient index lens.

In some implementations, polarization beam splitters 505 may be MZ interferometers. For example, a polarization beam splitter 505 may be manufactured from an MZ interferometer with a first optical length for a transverse electric (TE) polarization and a second optical length for a transverse magnetic (TM) polarization. In some implementations, optical coupler 501 may be implemented without collimating lenses corresponding to TX port 550, RX port 555, or COM port 560. For example, based on utilizing PLC optical circuitry for optical coupler 501, use of collimating lenses may be obviated, thereby reducing a size and/or a cost of optical coupler 501 relative to another type of optical coupler that uses collimating lenses.

As shown in FIG. 5B, a PLC 502' (e.g. a silicon photonic chip) having an optical coupler 501' may include a set of lenses 565, a waveplate 570, and a Faraday rotator 575 disposed in an optical path between polarization beam splitter 505-1 and polarization beam splitter 505-2 and mounted in a trench 520' of optical coupler 501'. In this case, the lenses 565 (e.g. silicon lenses) may collimate an optical beam directed through waveplate 570 and Faraday rotator 575, and may optically couple waveplate 570 and Faraday rotator 575 to a silicon waveguide of optical coupler 501'. In some implementations, trench 520' may be fabricated using a dry etching procedure on a surface of a silicon substrate, such as a silicon chip, of optical coupler 501'. In some implementations, polarization beam splitters 505 may be fabricated onto a silicon substrate, such as a silicon chip, of optical coupler 501', thereby reducing a cost and a manufacturing difficulty associated with mounting a polarization beam splitter onto a substrate. In some implementations, one or more finishing and/or protective layers may be deposited onto the substrate such that one or more components of PLC 502' are located in the substrate (where the substrate collectively refers to a base layer that is etched and the one or more finishing and/or protective layers deposited thereupon).

As shown in FIG. 5C, a PLC 502" having an optical coupler 501" may include a waveplate and Faraday rotator assembly 580. In some implementations, a Faraday rotator of waveplate and Faraday rotator assembly 580 is integrated onto a waveguide of optical coupler 501" based on depositing garnet material onto the waveguide. In this case, the garnet material may cause the waveguide to perform a non-reciprocal polarization rotation functionality. Similarly, a waveplate and Faraday rotator assembly 580 is integrated into the waveguide to provide a reciprocal polarization rotation functionality. In this way, optical coupler 501" may couple a transmitter and a receiver of an optical communications transceiver to an input (e.g. waveguide) and an output (e.g. waveguide) respectively of an optical coupler and to an optical fiber via a single common port with a reduced manufacturing complexity relative to another optical coupler that uses a free space garnet crystal. Furthermore, optical coupler 501" and/or other optical couplers described herein (e.g., optical coupler 501') may reduce a quantity of fibers for a transmitter/receiver pair to a single optical fiber and may remove the need to attach external circulators to couple two unidirectional ports to a single bidirectional fiber.

As indicated above, FIGS. 5A-5C are provided merely as examples. Other examples are possible and may differ from what was described with regard to FIGS. 5A-5C.

In this way, an optical coupler includes a set of optical components to couple an optical communications transceiver to a single optical fiber for bidirectional optical communication with reduced complexity, cost, and/or form factor size relative to other types of optical couplers.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean, "based, at least in part, on" unless explicitly stated otherwise.

What is claimed is:

1. An optical device, comprising:
    a set of components including:
        an input, an output, and a common port;
        a first beam splitter, a second beam splitter, and a third beam splitter;
        an optical rotator; and
    the set of components being disposed to form:
        an input optical path to couple an input optical beam of a first polarization from the input to the common port through the first beam splitter, the second beam splitter, and the optical rotator,
            the optical rotator to rotate the input optical beam to a second polarization orthogonal to the first polarization; and
        an output optical path to couple an output optical beam from the common port to the output, the output optical path having a first branch and a second branch,
            the first beam splitter to split the first branch and the second branch,
                the first branch to couple a first portion of the output optical beam through the first beam splitter, the second beam splitter, the third beam splitter, and the optical rotator, where the optical rotator is to effect no net change on a polarization of the first portion, and
                the second branch to couple a second portion of the output optical beam through the first beam splitter and the third beam splitter, and the third beam splitter to combine the first branch and the second branch.

2. The optical device of claim 1, where the set of components are disposed in the input optical path in an order of the input, the first beam splitter, the optical rotator, the second beam splitter, and the common port.

3. The optical device of claim 1, where the set of components are disposed in the first branch of the output optical path in an order of the common port, the second beam splitter, the optical rotator, the first beam splitter, the third beam splitter, and the output.

4. The optical device of claim 1, where the set of components are disposed in the second branch of the output optical path in an order of the common port, the second beam splitter, the third beam splitter, and the output.

5. The optical device of claim 1, where the set of components include:
    an optical isolator, disposed between the input and the first beam splitter, to block a portion of the output optical beam directed toward the input.

6. The optical device of claim 1, where the set of components include:
    a mirror, disposed between the first beam splitter and the second beam splitter, to direct the input optical beam or the output optical beam between the first beam splitter and the second beam splitter.

7. The optical device of claim 1, where the set of components include:
    a first lens, disposed between the input and the first beam splitter, to collimate the input optical beam;
    a second lens, disposed between the second beam splitter and the common port, to focus the input optical beam or collimate the output optical beam; and
    a third lens, disposed between the third beam splitter and the output, to focus the output optical beam.

8. A planar lightwave circuit, comprising:
    a set of components including:
        an input waveguide to couple to an optical communications transceiver;
        an output waveguide to couple to the optical communications transceiver;
        a common port to couple to an optical fiber;
        a first polarization beam splitter;
        a second polarization beam splitter;
        a third polarization beam splitter; and
        a rotator assembly including a Faraday rotator and a quarter-wave plate.

9. The planar lightwave circuit of claim 8, where one or more components, of the set of components, are to be implemented in a silicon substrate.

10. The planar lightwave circuit of claim 8, where the set of components are disposed to form an input optical path to couple the input waveguide to the common port and an output optical path to couple the common port to the output waveguide.

11. The planar lightwave circuit of claim 10, where the input optical path is disposed to direct an input optical beam from the input waveguide to the first polarization beam splitter, to the rotator assembly, to the second polarization beam splitter, and to the common port,
    the rotator assembly to alter a polarization state of the input optical beam.

12. The planar lightwave circuit of claim 10, where the output optical path is disposed to direct an output optical beam from the common port to the second polarization beam splitter, the second polarization beam splitter to split the output optical path into a first branch and a second branch,
the first branch being disposed to direct a first portion of the output optical beam to the first polarization beam splitter, the rotator assembly, and the third polarization beam splitter,
the rotator assembly to pass the first portion of the output optical beam,
the second branch being disposed to direct a second portion of the output optical beam to the third polarization beam splitter,
the third polarization beam splitter to recombine the first portion and the second portion and to provide a recombined output optical beam to the output waveguide.

13. The planar lightwave circuit of claim 8, where at least one of the first polarization beam splitter, the second polarization beam splitter, or the third polarization beam splitter is fabricated in a surface of the planar lightwave circuit.

14. The planar lightwave circuit of claim 8, where the planar lightwave circuit is a silicon chip.

15. An optical device, comprising:
an optical communications transceiver; and
an optical coupler to couple a transmitter of the optical communications transceiver and a receiver of the optical communications transceiver to a single optical fiber,
the optical coupler comprising:
an input optical path to couple the transmitter to a common port through a first beam splitter, a second beam splitter, and an optical rotator,
the optical rotator to rotate a first beam from the transmitter from a first polarization state to a second polarization state orthogonal to the first polarization state, and
an output optical path to couple the receiver to the common port, the second beam splitter to split the output optical path into a first branch and a second branch,
the first branch to couple a first portion of a second beam from the common port through the first beam splitter, the second beam splitter, a third beam splitter, and the optical rotator,
the optical rotator to cause no net change on a polarization state of the first portion,
the second branch to couple a second portion of the second beam through the first beam splitter and the third beam splitter,
the third beam splitter to recombine the first branch and the second branch and to couple the recombined first branch and second branch to the receiver.

16. The optical device of claim 15, further comprising an electronic integrated circuit (EIC) electrically connected to the optical communications transceiver.

17. The optical device of claim 15, where the optical communication transceiver and the optical coupler are implemented in a silicon chip.

18. The optical device of claim 15, where the optical coupler is an active optical cable (AOC) optically coupled to the optical communications transceiver.

19. The optical device of claim 15, where the optical coupler is implemented, at least partially, in free-space optics.

20. The optical device of claim 15, where the optical coupler is implemented, at least partially, in a planar lightwave circuit.

* * * * *